Patented Feb. 27, 1940

2,191,947

UNITED STATES PATENT OFFICE 2,191,947

COATING COMPOSITIONS

Edward R. Allen, Summit, N. J., and James B. Bullitt, Jr., Swarthmore, and Horace H. Hopkins, Springfield, Pa., assignors to E. I. du Pont de Nemours & Company, Wilmington, Del., a corporation of Delaware No Drawing. Application January 7, 1936, Serial No. 58,020. Renewed August 31, 1939

10 Claims. (Cl. 260—40)

This invention relates to coating compositions and more particularly to white coating compositions, such as are baked and are highly resistant to yellowing on aging.

White baking enamels, such as are made from synthetic resinous ingredients, have a slightly yellowish cast and are not as pure a white as is desired in the trade. To reduce this yellowish cast to a minimum or to eliminate it, the practice has been resorted to of introducing small quantities of blue pigment, such as Ultramarine Blue or the Iron Blues and also a small quantity of a maroon pigment. The maroon pigments which are satisfactory for this purpose with respect to color and other properties, are the organic maroons, that is, maroons of the lake pigment type.

Such maroon pigments are, however, not fast to light and readily fade or bleach entirely. This fading or bleaching of the maroon pigment nullifies the effect of producing a pure white and leaves the blue pigment with the yellow in the original white pigment, thus producing a greenish tone. This greenish tone is not at all desirable. There are certain maroon colored pigments such as cadmium maroon (cadmium selenide), the Indian reds (hydrated iron oxide), and Madder Lake which are relatively permanent to fading or bleaching but do not possess the proper shade to produce with the blue a satisfactory pure white. They are too yellow in undertone, being too "muddy" and not possessing the desired purity. It is therefore desirable to have as a maroon constituent of white baking enamels of an organic nature one possessing good color stability.

This invention has as an object the provision of a process for producing improved non-yellowing white baking enamels of an organic type. A further object is the provision of improved compositions for use as white baking enamels which possess a pure white color initially and a minimum tendency to yellowing on aging when in service.

These and other objects which will be evident hereinafter are accomplished by the use of, as the maroon pigment constituent of white pigment one which possesses desired shade and color stability.

We have found that such inorganic maroon pigments as Mineral Violet and Cobalt Violet possess the desired color and proper color stability for producing a pure white when used with the usual white pigments in combination with blue and also of reducing to a minimum the yellowing on aging when the white enamels are in service. Mineral Violet, also known as Permanent Violet and Nurenberger Violet, is described in Artists Pigments—F. W. Weber (1923) D. Van Nostrand Company, as "a double salt of phosphoric acid with manganese and ammonium."

Cobalt Violet pigment such as manufactured by the Harshaw Chemical Company, for example, Cobalt Violet No. 65, has been found to be particularly satisfactory. To the best of our knowledge Cobalt Violet No. 65 is a cobalt ammonium phosphate containing about 60% cobalt calculated as the oxide $Co_2O_3$.

The following examples will illustrate the invention but are not intended as limitations thereto except as indicated in the appended claims.

Example I

| | Per cent by weight |
|---|---|
| Titanium oxide | 35.0 |
| Zinc oxide | 2.1 |
| Resin | 29.6 |
| Mineral Violet | 0.05 |
| Ultramarine Blue | 0.05 |
| Aromatic hydrocarbon | 12.7 |
| Aliphatic hydrocarbon | 17.0 |
| Ester solvents | 2.5 |

The resin used in the above example was a 50% soya-bean oil modified glyceryl phthalate. This was prepared in the known manner by reacting with heat treatment glycerol, phthalic acid and the mixture of acids obtained from the hydrolysis of soya-bean oil. When the oil is used instead of the acids derived therefrom the oil is first reacted with the glycerol and the product obtained heated with phthalic anhydride. Any of the polyhydric alcohols and polybasic acids known to be suitable for making resins of the present kind may be used.

Example II

| | Per cent by weight |
|---|---|
| Titanium oxide | 25.0 |
| Zinc oxide | 1.50 |
| Resin | 36.00 |
| Cobalt Violet | 0.10 |
| Ultramarine Blue | 0.05 |
| Hydrocarbon solvent | 37.35 |

The resin used in the above example was a 50% cottonseed oil modified glyceryl phthalate.

Example III

| | Per cent by weight |
|---|---|
| Calcium base Titanox | 35.0 |
| Antimony oxide | 5.0 |
| Resin | 24.0 |
| Permanent Blue Lake | 0.1 |
| Cobalt Violet | 0.2 |
| Hydrocarbon solvent | 35.7 |

The resin used in the above example was a 55% Corn oil modified glyceryl phthalate.

These enamels when applied to suitably prepared surfaces such as metal and baked at a temperature of 250° F. to 350° F. for a time period of from about one to two hours, produce a pure white film highly desirable in the industry and such films are substantially free from so-called after-yellowing on aging in service.

If it is desired to produce air drying enamels, cobalt or other driers may be added. The type of drier as well as the quantity will be readily apparent to those skilled in the art.

The enamels which are illustrated by the foregoing examples are prepared according to methods well known to those skilled in the art.

Other resins than those noted in the examples may be used, such as are, for example, disclosed in U. S. Patent No. 1,983,460, issued to Hopkins and Stewart.

The invention may also be produced, although somewhat less advantageously, by using other vehicles, particularly those based upon the drying oils instead of the oil modified resins used in the examples.

Other white pigments than titanium dioxide may be used. The term "white pigments" as herein used embraces such as are selected from the class of white pigments known to those skilled in the art that have a satisfactory degree of resistance to normal yellowing in enamel compositions of the prior art. Among such, in addition to titanium oxide and zinc oxide, are zinc sulphide, antimony oxide, calcium or barium base extended titanium oxide pigments, etc. Suitable mixtures may be used with one or another of the ingredients of the mixture predominating. The use of titanium oxide in predominating amounts is, however, preferred. In place of the Ultramarine Blue used as the blue pigment constituent, other blue pigments as the cobalt blues, Indanthrene Blue Lake, etc., may be used.

The maroon pigment constituent is found to be most effective and satisfactory when used in an amount ranging between 0.001% and 0.3%, based on the total liquid composition, although the preferred amount is of the order of 0.05%. Variations in the amount used will depend to some extent on the application to be made of the finished enamel and will be readily apparent to those skilled in the art.

The invention is particularly adaptable to the maufacture of organic white enamels of the polyhydric alcohol-polybasic acid type to be used as protective and decorative coatings on refrigerator cabinets of various types, hospital furniture, kitchen cabinets, bathroom fixtures, etc. In fact wherever a pure white, highly lustrous, long-wearing and water-resistant film is desired which will be not only initially of a pure white color but will retain its purity of color during aging in service.

As many apparently widely different embodiments of this invention may be made without departing from the spirit and scope thereof, it is to be understood that we do not limit ourselves to the specific embodiments thereof except as defined in the appended claims.

We claim:

1. An article which comprises metal covered with a coating of hard white enamel, said enamel composition comprising a polyhydric alcohol-polybasic acid resin, white pigment consisting of a titanium pigment admixed with a small quantity of zinc oxide, a blue tinting pigment and a maroon pigment selected from the class consisting of Mineral Violet and Cobalt Violet in an amount of between approximately 0.001% and 0.300%.

2. A coating composition resistant to yellowing in the film upon aging which comprises a vehicle and pigment comprising a major proportion of white pigment, a blue tinting pigment, and a small amount of a maroon pigment selected from the class consisting of Mineral Violet and Cobalt Violet pigments.

3. The composition set forth in claim 2 in which said vehicle is an oil modified polyhydric alcohol-polybasic acid resin.

4. The composition set forth in claim 2 in which said white pigment comprises titanium pigment.

5. The composition set forth in claim 2 in which said white pigment is titanium pigment admixed with a small amount of zinc oxide.

6. A white coating composition comprising a vehicle, a white pigment, a blue tinting pigment, and a maroon pigment which comprises about 0.001% to 0.3% Mineral Violet pigment based upon the total liquid composition.

7. A white coating composition comprising a vehicle, a white pigment, a blue tinting pigment, and a maroon pigment which comprises about 0.001% to 0.3% Cobalt Violet pigment based upon the total liquid composition.

8. A coating composition resistant to yellowing in the film upon aging which comprises an oil modified polyhydric alcohol-polybasic acid resin and pigment comprising a major proportion of white pigment consisting preponderately of titanium pigment, a blue tinting pigment, and a small amount of a maroon pigment selected from the class consisting of Mineral Violet and Cobalt Violet pigments.

9. The coating composition set forth in claim 2 in which said vehicle is an oil modified glyceryl phthalate resin.

10. The coating composition set forth in claim 2 in which said vehicle comprises the resinous reaction product of adipic acid and ethylene glycol.

EDWARD R. ALLEN.
JAMES B. BULLITT, Jr.
HORACE H. HOPKINS.